United States Patent
Sevindik et al.

(10) Patent No.: US 11,797,472 B2
(45) Date of Patent: Oct. 24, 2023

(54) DATA CACHE MECHANISM THROUGH DUAL SIM PHONE

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 401 days.

(21) Appl. No.: 16/656,525

(22) Filed: Oct. 17, 2019

(65) Prior Publication Data

US 2021/0117368 A1  Apr. 22, 2021

(51) Int. Cl.
*H04W 24/10* (2009.01)
*G06F 15/173* (2006.01)
(Continued)

(52) U.S. Cl.
CPC ...... *G06F 15/17331* (2013.01); *H04W 24/10* (2013.01); *H04W 48/20* (2013.01);
(Continued)

(58) Field of Classification Search
CPC . G06F 15/17331; H04W 24/10; H04W 48/20; H04W 60/005; H04W 60/04;
(Continued)

(56) References Cited

U.S. PATENT DOCUMENTS 8,200,212 B2  6/2012  Rappaport et al.
8,897,702 B2  11/2014  Niu et al.
(Continued)

FOREIGN PATENT DOCUMENTS

WO  2017136959 A1  8/2017
WO  WO2017136959 A1  8/2017
WO  2020070716 A1  4/2020

OTHER PUBLICATIONS

Daoud et al., "On The Performance of CBRS Fixed Wireless Access: Coverage and Capacity Field Study", Sep. 2019, 41 pages, https://www.nctatechnicalpapers.com/Paper/2019/2019-on-the-performance-of-cbrs-fixed-wireless-access.
(Continued)

*Primary Examiner* — Ankur Jain
(74) *Attorney, Agent, or Firm* — Otterstedt & Kammer PLLC (57) ABSTRACT

An aspect includes a method for use with a mobile communications device comprising a plurality of subscriber identification modules sharing a cache. The method includes a first subscriber identification module authenticating with and connecting to the network, followed by a second subscriber identification module authenticating with and connecting to the network. The method also includes, while the first subscriber identification module is requesting and receiving first data from the network and storing the first data in the cache, the second identification module requesting and receiving second data from the network and storing the second data in the cache. The method further includes an application executing on the device retrieving and processing at least a portion of the first and second data stored in the cache, while at least one of the first and second subscriber identification modules is storing additional data received from the network in the cache.

18 Claims, 5 Drawing Sheets

(51) Int. Cl.
  *H04W 60/00* (2009.01)
  *H04W 60/04* (2009.01)
  *H04W 48/20* (2009.01)
  *H04W 88/02* (2009.01)
(52) U.S. Cl.
  CPC ......... *H04W 60/005* (2013.01); *H04W 60/04* (2013.01); *H04W 88/02* (2013.01)
(58) Field of Classification Search
  CPC ..... H04W 88/02; H04W 12/72; H04W 76/15; H04W 8/183; H04W 12/06; H04W 88/06
  USPC ...................................................... 455/558
  See application file for complete search history.

(56) References Cited

U.S. PATENT DOCUMENTS

| | | | |
|---|---|---|---|
| 9,826,570 | B1 | 11/2017 | Gupta et al. |
| 9,854,004 | B2 | 12/2017 | Bharadwaj |
| 10,263,694 | B2* | 4/2019 | Marko ............... H04B 7/18563 |
| 10,492,204 | B2 | 11/2019 | Kakinada et al. |
| 10,623,943 | B1 | 4/2020 | Sevindik et al. |
| 10,708,857 | B2 | 7/2020 | Dhillon et al. |
| 11,019,563 | B1 | 5/2021 | Sevindik et al. |
| 11,516,710 | B2* | 11/2022 | Cuevas Ramirez .. H04W 36/08 |
| 2004/0090971 | A1 | 5/2004 | Anderson |
| 2008/0155589 | A1 | 6/2008 | McKinnon et al. |
| 2009/0187480 | A1 | 7/2009 | Bernard et al. |
| 2011/0264530 | A1 | 10/2011 | Santangelo et al. |
| 2013/0182697 | A1 | 7/2013 | Tuominen et al. |
| 2014/0199993 | A1* | 7/2014 | Dhanda et al. |
| 2015/0223090 | A1 | 8/2015 | Van Lieshout et al. |
| 2015/0295692 | A1 | 10/2015 | Gowda et al. |
| 2015/0373554 | A1 | 12/2015 | Freda et al. |
| 2016/0135213 | A1* | 5/2016 | Zhu ....................... H04L 1/0013 370/329 |
| 2017/0094628 | A1* | 3/2017 | Miao ...................... H04W 60/00 |
| 2017/0127305 | A1 | 5/2017 | Dev et al. |
| 2017/0134994 | A1 | 5/2017 | Chinthalapudi et al. |
| 2017/0181071 | A1 | 6/2017 | Lipka |
| 2018/0014179 | A1* | 1/2018 | Chan ..................... H04W 24/10 |
| 2018/0026903 | A1 | 1/2018 | Kotreka et al. |
| 2018/0027567 | A1 | 1/2018 | Saghir et al. |
| 2018/0097585 | A1* | 4/2018 | Dev ....................... H04W 72/02 |
| 2018/0220329 | A1* | 8/2018 | Arumugam ......... H04L 65/1073 |
| 2018/0270649 | A1* | 9/2018 | Tsai ...................... H04W 8/205 |
| 2018/0309683 | A1* | 10/2018 | Chan ...................... H04L 47/20 |
| 2019/0045397 | A1 | 2/2019 | Mueck et al. |
| 2019/0058999 | A1 | 2/2019 | Gunasekara et al. |
| 2019/0069004 | A1 | 2/2019 | Badawiyeh |
| 2019/0069224 | A1 | 2/2019 | Lee et al. |
| 2019/0082446 | A1* | 3/2019 | Guo ................... H04W 72/1215 |
| 2019/0090309 | A1 | 3/2019 | Wong et al. |
| 2019/0115950 | A1 | 4/2019 | Kakinada et al. |
| 2019/0116239 | A1* | 4/2019 | Jagannath ........... H04L 41/0896 |
| 2019/0150134 | A1 | 5/2019 | Kakinada et al. |
| 2019/0223025 | A1 | 7/2019 | Kakinada |
| 2019/0230500 | A1 | 7/2019 | Gonçalves |
| 2019/0294829 | A1* | 9/2019 | Zhou ................... G06F 13/4282 |
| 2019/0364565 | A1 | 11/2019 | Hmimy et al. |
| 2019/0372689 | A1* | 12/2019 | Carter ................... H04W 24/10 |
| 2020/0008007 | A1* | 1/2020 | Belghoul ................ H04W 4/50 |
| 2020/0008196 | A1* | 1/2020 | Low .................. H04W 72/0453 |
| 2020/0037211 | A1 | 1/2020 | Hine et al. |
| 2020/0068647 | A1* | 2/2020 | Jha ....................... H04W 60/005 |
| 2020/0100098 | A1* | 3/2020 | Bai ........................ H04W 8/183 |
| 2020/0107293 | A1* | 4/2020 | Cui ......................... H04W 8/20 |
| 2020/0112851 | A1* | 4/2020 | Wane .................... H04L 67/306 |
| 2020/0146032 | A1* | 5/2020 | Bae ..................... H04L 27/2636 |
| 2020/0169858 | A1* | 5/2020 | Hu ..................... H04W 36/0088 |
| 2020/0008143 | A1 | 7/2020 | Jain |
| 2020/0329523 | A1 | 10/2020 | Yi et al. |
| 2022/0182812 | A1 | 6/2022 | Sevindik et al. |

OTHER PUBLICATIONS

3rd Generation Partnership Project (3GPP), Technical Specification (TS) Group Services and System Aspects, "General Packet Radio Service (GPRS) enhancements for Evolved Universal Terrestrial Radio Access Network (E-UTRAN) access", TS 23.401 V16.5.0, Dec. 2019, 423 pages, http://www.3gpp.org/ftp//Specs/archive/23_series/23.401/23401-g30.zip.

The Software Defined Radio Forum Inc., Spectrum Sharing Committee Work Group 1 (WG1), "CBRS Operational and Functional Requirements" (Requirements for Commercial Operation in the U.S. 3550-3700 MHz Citizens Broadband Radio Service Band), WINNF-TS-0112-V1.9.0, Dec. 2019, 81 pages, https://winnf.memberclicks.net/assets/CBRS/WINNF-TS-0112.pdf.

CBRS Alliance, "CBRS Network Services Use Cases and Requirements", CBRSA-TS-1001 V2.0.0, Dec. 2018, 37 pages, https://www.cbrsalliance.org/wp-content/uploads/2018/12/CBRSA-TS-1001-V2.0.0_Published-December-112c-2018.pdf.

CBRS Alliance, "CBRS Network Services Stage 2 and 3 Specification", CBRSA-TS-1002 V2.0.0, Feb. 2019, 52 pages, https://www.cbrsalliance.org/wp-content/uploads/2019/04/CBRSA-TS-1002-V2.0.0_Published-April-5-2019.pdf.

Volkan Sevindik et al., unpublished U.S. Appl. No. 16/807,054, filed Mar. 2, 2020, Dual Subscriber Dentification Module (SIM) Customer Premises Equipment (CPE) for Wireless Network Power Measurements pp. 1-31 and 7 sheets drawings.

Volkan Sevindik et al., unpublished U.S. Appl. No. 16/744,000, filed Jan. 15, 2020, Customer Premises Equipment (CPE) Self-Organization in Fixed Wireless Access (FWA) Network pp. 1-29 and 7 sheets drawings.

Android Central, What is dual 4G LTE, and why should you care? 3 Pages, Downloaded from https://www.androidcentral.com/what-dual-4g-lte-and-why-should-you-care, dated Jul. 5, 2018.

Mediatek, Dual SIM, Dual 4G VoLTE Smartphones, https://www.mediatek.com/features/dual-4g-volte, 3 Pages, Downloaded Sep. 17, 2019.

Official Android Blog: Android 5.1: Unwrapping a new Lollipop update, pp. 1-3, dated Mar. 9, 2015, https://android.googleblog.com/2015/03/android-51-unwrapping-new-lollipop.html.

Verizon Wireless, Apple® iPhone®—Turn Voice & Data On / Off—HD Voice, https://www.verizonwireless.com/support/knowledge-base-206984/, 3 Pages, Downloaded Sep. 17, 2019.

Wikipedia, "Phablet," last edited on Nov. 3, 2019, pp. 1-14, https://en.wikipedia.org/wiki/Phablet.

Wikipedia, "Dual SIM," last edited on Nov. 6, 2019, pp. 1-6, https://en.wikipedia.org/wiki/Dual_SIM.

OnQ Blog, Multi-SIM smartphones to enhance your 5G experience, Nov. 18, 2019, https://www.qualcomm.com/news/onq/2019/11/18/multi-sim-smartphones-enhance-your-5g-experience, pp. 1-7.

Volkan Sevindik et al., Unpublished U.S. Appl. No. 16/441,607, filed Jun. 14, 2019, pp. 1-32 plus 8 Sheets Drawings.

The Wireless Innovation Forum, Copyright 2018, Acronyms and Definitions Pertaining to Commercial Operations in the U.S. 3550-3700 MHz Band, pp. 1-10.

Fierce Wireless, Charter updates MVNO progress, explores dual SIM connectivity, May 1, 2019, pp. 1-4, https://www.fiercewireless.com/wireless/charter-updates-mvno-progress . . . .

Fierce Wireless, Charter's MVNO counts 21,000 lines as executives hint at eSIM plans a . . . , Oct. 26, 2018, pp. 1-5, https://www.fiercewireless.com/wireless/charter-s-mvno-counts-21-000-l . . . .

Volkan Sevindik et al., unpublished U.S. Appl. No. 16/777,751, filed Jan. 30, 2020, Data Transfer Using a Dual Sim Phone pp. 1-31 and 10 sheets drawings.

Authorized Officer Harry C. Kim PCT Application PCT/US2020/055963 International Search Report and Written Opinion of The ISA, 8 Pages Total, dated Dec. 21, 2020.

* cited by examiner

DATA CACHE MECHANISM THROUGH DUAL SIM PHONE

FIELD OF THE INVENTION

The present invention relates generally to the electrical, electronic, and computer arts, and more particularly relates to enhancements in wireless communications.

BACKGROUND OF THE INVENTION

Conventional LTE (Long Term Evolution) generally uses licensed radio frequency spectrum for communications between mobile devices and cellular networks. A new unlicensed (shared) spectrum scheme is being introduced in the United States at 3.5 GHz (gigahertz) called CBRS (Citizens Broadband Radio Service). Licensed spectrum and unlicensed spectrum can be used for third generation (3G), fourth generation (4G), and even fifth generation (5G) wireless communications.

In certain instances, conventional LTE networks offer both voice and data services to user equipment via a single subscription such as a single SIM (Subscriber Identification Module). As well known, a subscriber identity module (SIM) is an integrated circuit that securely stores information such as the International Mobile Subscriber Identity (IMSI) number and its related key, which are used to identify and authenticate subscribers on mobile telephony devices (such as mobile phones and computers). It is also possible to store contact information on many SIM cards. However, there are deficiencies associated with conventional LTE cellular networks (e.g., 3G, 4G, 5G) and use of a single SIM to support data or voice services or a dual SIM that supports use of only one SIM at a time.

SUMMARY OF THE INVENTION

An aspect includes a method for use with a mobile device comprising a plurality of subscriber identification modules sharing a cache. The method includes a first subscriber identification module authenticating with and connecting to the network, followed by a second subscriber identification module authenticating with and connecting to the network. The method also includes, while the first subscriber identification module is requesting and receiving first data from the network and storing the first data in the cache, the second identification module requesting and receiving second data from the network and storing the second data in the cache. The method further includes an application executing on the device retrieving and processing at least a portion of the first and second data stored in the cache, while at least one of the first and second subscriber identification modules is storing additional data received from the network in the cache.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments may improve user experience, e.g., when using the CBRS spectrum for data and voice connectivity and communications. For example, one or more embodiments may prevent a user from being disconnected or experiencing a degraded level of quality of service (QoS) if the unlicensed spectrum connection becomes degraded or untenable.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

In an illustrative embodiment, dual SIM devices may be connected to a network using unlicensed spectrum and/or a network using licensed spectrum. More particularly, in an illustrative embodiment, a service provider may provision the dual SIM device with one SIM for operation with unlicensed spectrum and one SIM for operation with licensed spectrum. The unlicensed spectrum SIM may be associated with the service provider and the licensed spectrum SIM may be associated with another service provider, however, both the unlicensed spectrum SIM and the licensed spectrum SIM may be operated by the service provider. However, as further discussed herein, embodiments of the invention may be used when both SIMs are provisioned for operation with unlicensed spectrum and/or when both SIMs are provisioned for operation with unlicensed spectrum.

In an illustrative embodiment, the unlicensed spectrum may be a Citizens Broadband Radio Service (CBRS) spectrum which is controlled by a spectrum access system (SAS). CBRS spectrum is a type of unlicensed spectrum or shared spectrum which is shared between multiple entities including government users (such as the military), licensed users, and non-licensed users. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference limited network which means that the performance of the network and the data sent to CBRS subscribers is limited by the amount of interference the CBRS users or subscribers experience in the frequency band of operation. Although illustrative embodiments are discussed herein primarily with reference to CBRS, embodiments of the present invention may be utilized with other unlicensed and/or licensed spectrum schemes.

Figure 1:
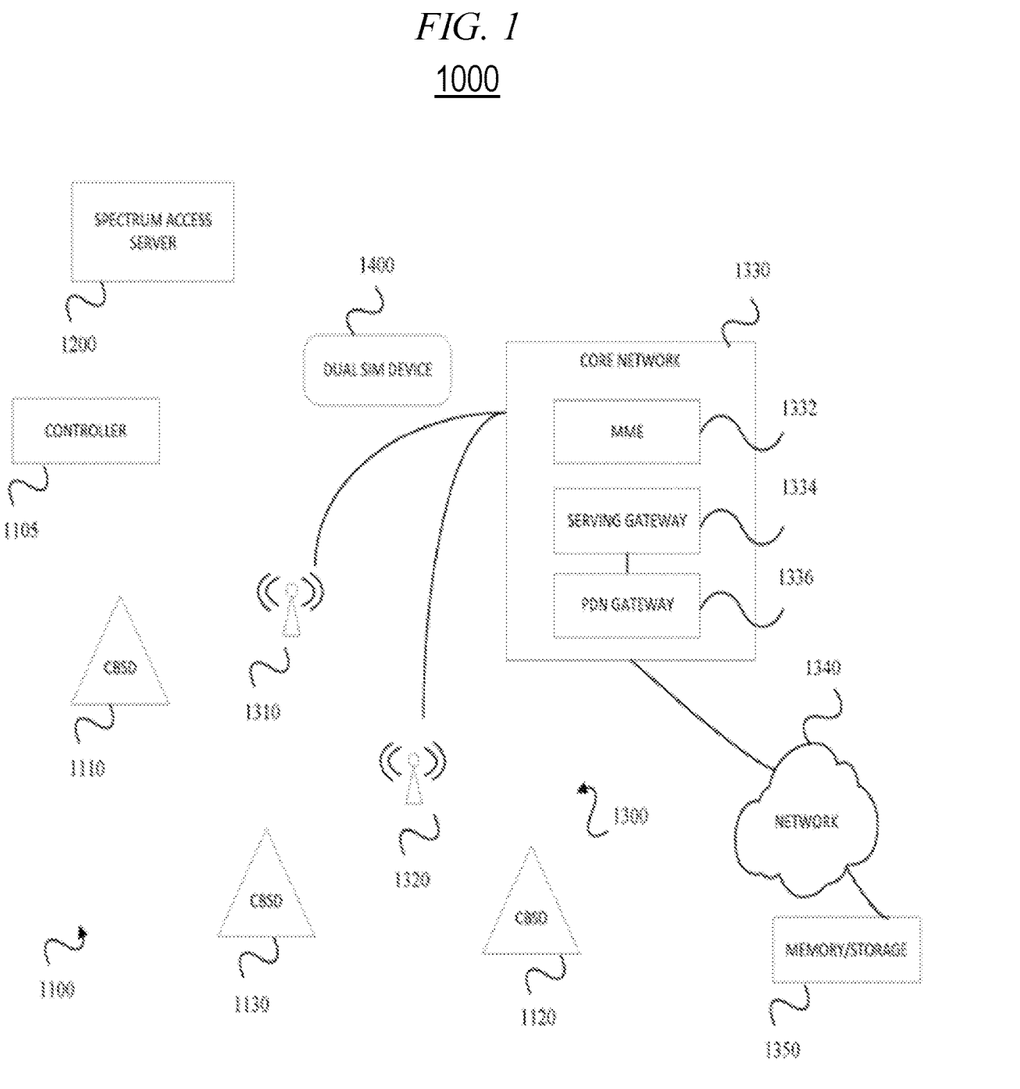
FIG. 1 is a diagram of an exemplary network architecture usable with a dual SIM device in accordance with one or more aspects of the invention.

FIG. 1 is a diagram of an exemplary network architecture usable with a dual SIM device in accordance with one or more aspects of the invention. More particularly, FIG. 1 is a diagram of an example architecture 1000 where dual SIM devices connect and communicate in unlicensed spectrum and/or licensed spectrums networks operated by a service provider. In an illustrative embodiment, the architecture 1000 may include a CBRS network 1100 which may provide wireless coverage. The CBRS network 1100 may include CBSDs 1110, 1120, and 1130. In an implementation, the CBSDs 1110, 1120, and 1130 may form a cluster that may be controlled by a controller 1105. The number of clusters and the number of CBSDs is illustrative and the architecture 1000 may include more or less clusters and each cluster may include more or less CDSDs. The architecture 1000 may include a SAS 1200 which is connected to or in communication (collectively "in communication with") with each of the CBSDs 1110, 1120, and 1130, or the controller 1105 when appropriate.

In an illustrative embodiment, the architecture 1000 may include a licensed spectrum network 1300 which may provide wireless coverage. The licensed spectrum network 1300 may include base stations 1310 and 1320. The number of base stations is illustrative and the architecture 1000 may include more or less base stations. The 1310 and 1320 may be in communication with a core network 1330, which may include a mobility management entity (MME) 1332, a serving gateway 1334, and a packet data network (PDN) gateway 1336. The core network 1330 may be in communication with a network 1340, which may include at least the Internet, and which may in communication with a memory/storage 1350.

A dual SIM device 1400 may be in communication with one of the CBSDs 1110, 1120, and 1130, and/or one of the base stations 1310 and 1320. The communications between the dual SIM device 1400, particular CBSDs 1110, 1120, and 1130, the SAS 1200, the controller 1105 when applicable, particular base stations 1310 and 1320, the core network 1330, the network 1340, and the memory/storage 1350, as appropriate and applicable, may include wired communications, wireless communications, or a combination thereof. The architecture 1000 is illustrative and may include additional, fewer or different devices, entities and the like which may be similarly or differently architected without departing from the scope of the specification and claims herein. For example, embodiments of the present invention may be used with only one of the two networks shown in 1000, i.e., only unlicensed network 1100 and/or only licensed network 1300. Moreover, the illustrated devices may perform other functions without departing from the scope of the specification and claims herein.

The CBSDs 1110, 1120, and 1130 may be a base station, an access point, an access node or like device which enables radio communications access between, for example, the dual SIM device 1400 to other devices. Each CBSD 1110, 1120, and 1130 may be authorized and granted spectrum allocation by the SAS 1200 (which may be communicated via the controller 1105, for example, in an implementation). Each CBSD 1110, 1120, and 1130 may have sectors which provide wireless communications coverage.

The base stations 1310 and 1320 may be a node-B, an evolved node-B, an access point, an access node or like device which enables radio communications access between, for example, the dual SIM device 1400 to other devices. Each base station 1310 and 1320 may have sectors which provide wireless communications coverage.

In an implementation, the CBSDs 1110, 1120, and 1130 may be owned and operated by the service provider, and the base stations 1310 and 1320 may be owned by a multiple systems operator and may be operated by the service provider. That is, the CBRS network 1100 and the licensed spectrum network 1300 may be operated by the same service provider, although this is not a requirement of the invention.

The dual SIM device 1400 may be, but is not limited to, end user devices, cellular telephones, Internet Protocol (IP) devices, mobile computers, laptops, handheld computers, PDAs, personal media devices, smartphones, notebooks, notepads, phablets and the like which may include two (2) SIMs and at least one radio. One SIM of the dual SIM device 1400 may be provisioned for operation with the CBRS network 1100 and the other SIM may be provisioned for operation with the licensed spectrum network 1300.

The SAS 1200 enables access to the CBRS spectrum and dynamically manages the spectrum for optimal use, efficiency, and compliance with CBRS rules. The SAS 1200 communicates with each CBSD for registration, grant allocation/deallocation and interference management. The SAS 1300 may perform interference analysis based on power measurements.

Operationally, and as described in detail herein below, the SAS 1200 may grant spectrum to each activated CBSD, such as the CBSDs 1110, 1120, and 1130 and may establish a wireless coverage of CBRS network 1100. In an implementation, the communication may be via the controller 1105. Base stations 1310 and 1320 may establish a wireless coverage of licensed spectrum network 1300.

Figure 2:
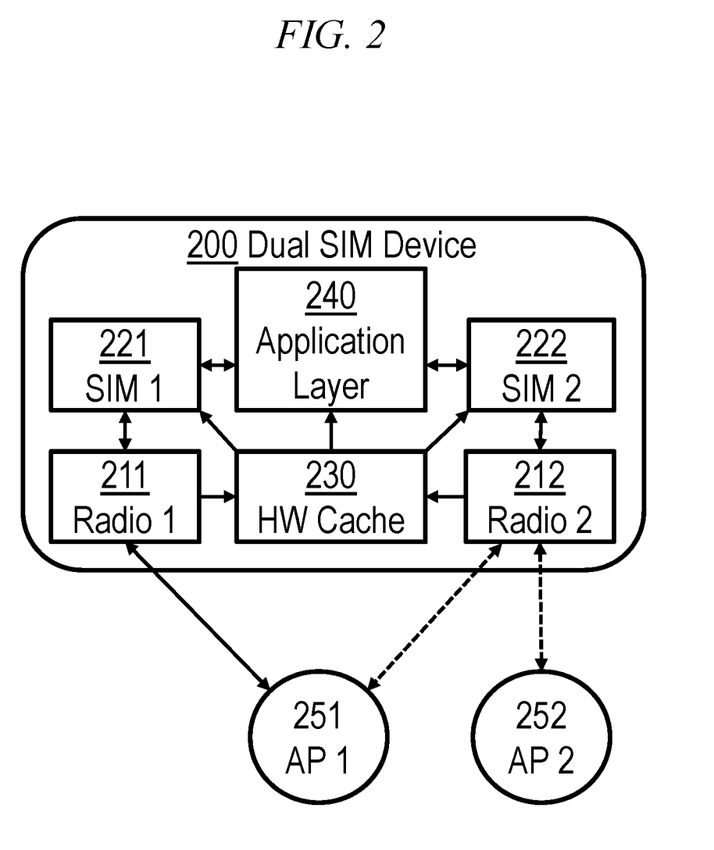
FIG. 2 is a block diagram of a dual SIM device with a data cache in accordance with one or more aspects of the invention.

FIG. 2 is a block diagram of a dual SIM device with a data cache in accordance with one or more aspects of the invention. Device 200 may implement, for example, the dual SIM device 1400 discussed above with reference to FIG. 1. Device 200 may include, but is not limited to, a first radio frequency transceiver (Radio1) 211, a first SIM controller (SIM1) 221 coupled to the first radio frequency device 211, a second radio frequency transceiver (Radio2) 212, a second SIM controller (SIM2) 222 coupled to the second radio frequency transceiver 212, a shared cache 230 coupled to the radios 211 and 212, and an application layer 240 coupled to the SIMs 221 and 222. Device 200 may include other elements which may be desirable or necessary to implement embodiments of the present invention, such as the processor and memory discussed below with reference to FIG. 5. For example, device 200 may also include additional SIMs and/or radios.

Device 200 is a Dual SIM Dual Active (DSDA) device in which each of the radio transceivers 211 and 212, coupled to and independently controlled by respective SIMs 221 and 222, can simultaneously transmit and/or receive data from a network. For example, radio transceiver 212 (controlled by SIM 222) can receive data at the same time that radio transceiver 211 (controlled by SIM 221) is receiving data. Although it is common parlance to refer to SIMs 221 and 222 receiving data (e.g., from a network), the data is actually received from the network by the radios 211 and 212 associated with the SIMs.

Radios 211 and 212 (and thus SIMs 221 and 222) may simultaneously connect to (e.g., receive data from) the same access point (in some embodiments, either the same sector or different sectors) 251. However, radios 211 and 212 (and thus SIMs 221 and 222) may each connect to (e.g., receive data from) a different access point: radio 211 may connect to a first access point (AP 1) 251, while radio 212 may connect to a second access point (AP 2) 252. Generally, access points 251 and/or 252 may comprise CBSDs (e.g., 1110, 1120, 1130) and/or base stations (e.g., 1310, 1320) as discussed above with reference to FIG. 1. In an illustrative embodiment, SIMs 221 and 222 (and thus radios 211 and 212) may connect to (e.g., receive data from) the same network (e.g., 1100 or 1300 in FIG. 1). More particularly, in an illustrative embodiment, SIMs 221 and 222 (through radios 211 and 212) are both configured to connect to, and receive data from, an unlicensed network, such as CBRS 1100 in FIG. 1. Radios 211 and 212 (and thus SIMs 221 and 222) may simultaneously connect to (e.g., receive data from) the same CBSD (in some embodiments, either the same sector or different sectors) 251 which may correspond to, e.g., 1110 in FIG. 1. However, radios 211 and 212 (and thus SIMs 221 and 222) may each connect to (e.g., receive data from) a different CBSD within the same network (e.g., 1100 in FIG. 1): radio 211 may connect to a first CBSD 251 which may correspond to, e.g., 1110 in FIG. 1, while radio 212 may connect to a second CBSD 252 which may correspond to, e.g., 1120 in FIG. 1.

In another illustrative embodiment, SIMs 221 and 222 (through radios 211 and 212) are both configured to connect to, and receive data from, a licensed network, such as 1300 in FIG. 1. Radios 211 and 212 (and thus SIMs 221 and 222) may simultaneously connect to (e.g., receive data from) the same base station (in some embodiments, either the same sector or different sectors) 251 which may correspond to, e.g., 1310 in FIG. 1. However, radios 211 and 212 (and thus SIMs 221 and 222) may each connect to (e.g., receive data from) a different base station within the same network (e.g., 1300 in FIG. 1): radio 211 may connect to a first base station 251 which may correspond to, e.g., 1310 in FIG. 1, while radio 212 may connect to a second base station 252 which may correspond to, e.g., 1320 in FIG. 1.

In a further illustrative embodiment, a dual SIM device 200 may be connected to a CBSD such as CBSDs 1110, 1120, and 1130 within CBRS network 1110 using a first radio 211. The second radio 212 of the dual SIM device 200 may connect to a second network, such as for example, the licensed spectrum network 1300 via base stations 1310 and 1320. Thus, the first SIM 221 may be provisioned for operation with unlicensed spectrum, CBRS spectrum or the like as operated by a service provider, and the second SIM 222 may be provisioned with another MSO or the like but operated by the service provider.

Device 200 includes a cache 230 which is coupled to both radios 211 and 212. In an illustrative embodiment, radios 211 and 212 store data received from the networks (e.g., from 251 and/or 252) in the same cache 230. Thus, shared cache 230 will include all data from both radios 211 and 212. Cache 230 is preferably implemented using hardware rather than software to allow for a capacity on the order of gigabytes rather than megabytes.

Application layer 240 is operative to read data stored in the cache (e.g., by both radios 211 and 212) and to perform various processing operations (e.g., displaying a video). Application layer 240 can determine its current and predicted future data needs, and can inform SIMs 221 and 222. Based on this information from application layer 240, as well as access to the contents of cache 230, SIMs 221 and 222 can instruct radios 211 and 212 to obtain the requested data. Because the first SIM 221 and second SIM 222 both save received data to the same cache 230 within the device 200, each SIM (e.g., 221) will always know how much data is saved in the cache 230 through the other SIM (e.g., 222).

Illustrative embodiments of the present invention utilize the dual SIMs 221 and 222, and the shared cache 230, to improve the throughput (e.g., speed and quality) of wireless communications. In the illustrative examples discussed herein, it is assumed that the primary unit (SIM 221 and radio 211) is being utilized to receive a streaming video comprising a series of packets. However, one skilled in the art will understand that this is not a requirement of the invention, and that illustrative embodiments of the present invention may be utilized in conjunction with transmission of any type of data, such as a file comprising a plurality of blocks.

In an illustrative embodiment, the primary unit (SIM 221 and radio 211) and the secondary unit (SIM 222 and radio 212) are operative to receive different portions of the same data (e.g., different blocks and/or packets of the same file and/or stream). For example, the primary unit may receive a first part (e.g., 60% of the blocks and/or packets) of a file and/or stream, while the secondary unit may receive a second part (e.g., 40% of the blocks and/or packets). The radios simultaneously receiving different portions of the data, and storing them in a shared cache, can accelerate (e.g., double) data transfer speeds.

In another illustrative embodiment, the primary unit (SIM 221 and radio 211) and the secondary unit (SIM 222 and radio 212) both receive the same data (e.g., the same packets and/or blocks of a file and/or stream). Simultaneously receiving duplicate data can provide redundancy, thereby enhancing error correction capabilities. By way of example, if a block and/or packet received by one radio (e.g., 211) is found to be corrupt (e.g., based on a checksum calculation), it can be replaced within the cache by an intact version of the same block and/or packet received by the other radio (e.g., 212). Duplicate data from radios 211 and 212 can be detected (e.g., based on application identifier, session identifier, and/or sequence identifier) and resolved within cache 230. In some embodiments, duplicate data within cache 230 may be deleted, e.g., where there is little available storage capacity within cache 230. However, where there is sufficient storage capacity available within cache 230, it may be desirable to keep both copies of the data (e.g., from radio 211 and from radio 212) in order to enhance reliability and resiliency.

In a further illustrative embodiment, the primary unit (SIM 221 and radio 211) may receive data which is currently being used by an application and/or user, while the secondary unit (SIM 222 and radio 212) may receive data which is deemed likely to be used by the application and/or user in the future. For example, radio 211 may receive packets corresponding to a portion (e.g., scene) of a video which the user is currently viewing, while radio 212 may receive packets corresponding to a subsequent portion (e.g., scene) of the video which the user will view if the user continues watching that video. As another example, radio 211 may receive packets and/or blocks corresponding to a video stream and/or file which the user is currently viewing, while radio 212 may receive packets and/or blocks corresponding to a video stream and/or file which the user is likely to view after the current video ends (e.g., one or more videos suggested to the user as being related to the current video).

In a still further illustrative embodiment, the primary unit (SIM 221 and radio 211) may receive data which is currently deemed to be high priority by an application and/or user, which may be used immediately, while the secondary unit (SIM 222 and radio 212) may receive data which is deemed to be lower priority by an application and/or user, which may be saved for later use. By way of example, radio 211 may receive a streaming video which the user is currently watching, while radio 212 may receive a system update which the user wishes to delay installing until after the user has finished watching the video. For instance, the user may wish to save the system update and install it at a time when the user is not connected to the network (e.g., is in airplane mode) or has a poor connection and therefore unable to watch streaming video.

As previously noted, device 200 in FIG. 2 is a Dual SIM Dual Active (DSDA) device in which each of the SIMs 221 and 222 is coupled to a respective radio transceiver 211 and 212. However, one or more embodiments of the present invention may also be applicable to a Dual SIM Dual Standby (DSDS) device, in which a plurality of SIMs may share a single radio transceiver. In such an implementation, the first SIM 221 and the second SIM 222 may operate on a time-slotted basis with a shared radio frequency transceiver, which would be coupled to a cache 230 as discussed above.

Thus, illustrative embodiments may receive data using a first SIM 221 and simultaneously buffer data in cache 230 using a second SIM 222. More particularly, first SIM 221 may receive real-time data, while second SIM 222 buffers data that can be consumed by the phone 200, and more particularly by application layer 240. In an embodiment, when good (e.g., above average) radio conditions are detected after the first SIM 221 connects to a CBSD, the second SIM 222 automatically turns on and connects to a CBSD. The second SIM 222 may connect to the same network as the first SIM 221, but it need not connect to the same CBSD as the first SIM 221. For example, the second SIM 222 can connect to a different CBSD within the network if the signal it receives from that CBSD is much better than the one that the first SIM 221 is receiving from the CBSD to which it is connected. While radio conditions are good (e.g., above average), the second SIM buffers the data that application layer 240 can consume in the future or when radio conditions are no longer good.

Figure 3:
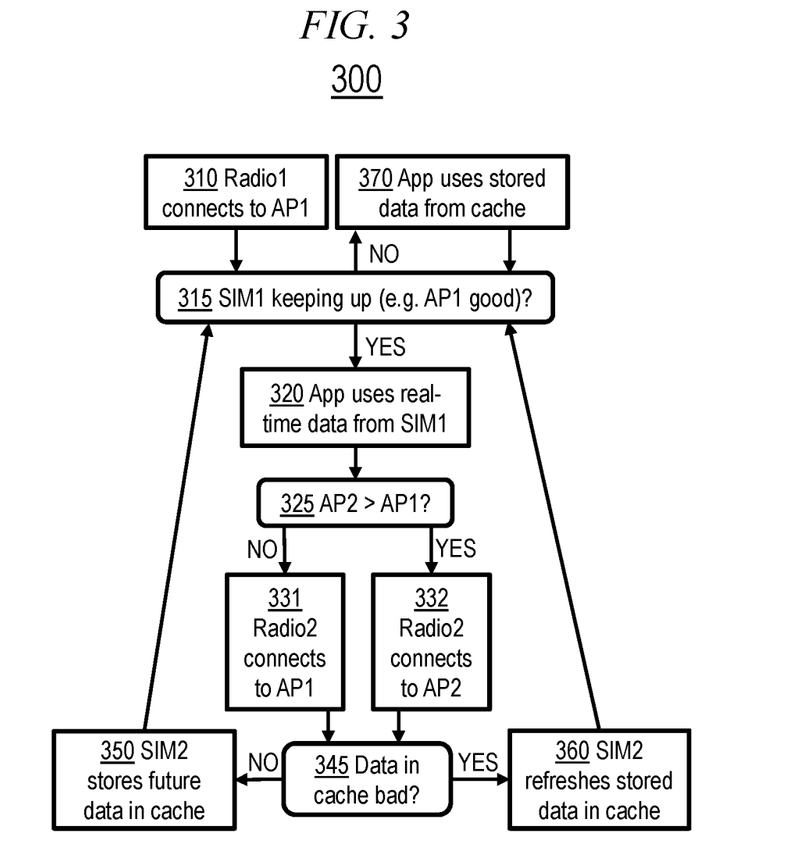
FIG. 3 is a flowchart showing a network communication process in accordance with one or more aspects of the invention.

FIG. 3 is a flowchart showing a network communication process in accordance with one or more aspects of the invention. It should be noted that in FIGS. 3 and 4, decision points are represented with rounded rectangles rather than diamonds. Process 300 begins with step 310, in which a first radio 211 (associated with first SIM 221) connects to a first access point 251, which could be a CBSD and/or a base station. Once first radio 211 is connected to the first access point 251, first SIM 221 begins receiving real-time data. Step 315 determines whether primary SIM 221 is able to meet the real-time data demands of application layer 240. For example, primary SIM 221 may be unable to provide data to application layer 240 with quantity and quality if its connection to the network through first radio 211 and first access point 251 is of poor quality, e.g., having a slow transmission speed and/or a high bit error rate. However, step 315 would test for any scenario in which data is consumed by application layer 240 faster than it can be provided by primary SIM 221. This may include situations where a bottleneck (limiting factor) involves processing bandwidth rather than network bandwidth.

For example, as discussed above, first SIM 221 may be connected to a unlicensed shared spectrum network, such as CBRS 1300 discussed above with reference to FIG. 1. Because spectrum is shared on a CBRS network, as the number of users on the network increases, the throughput per user decreases. Moreover, as previously mentioned, CBRS is an interference limited network which means that the performance of the network and the data sent to CBRS subscribers is limited by the amount of interference the CBRS users or subscribers experience in the frequency band of operation. The SAS performs interference management to protect higher tier users which may include, for example, dropping CBSDs which are general authorized access users. Thus, availability of CBRS spectrum—and quality of service (QoS)—dynamically changes depending on use by higher priority entities.

Step 315 may additionally or alternatively include a determination that radio conditions (e.g., for first radio 211) are above a specified threshold and/or better than average. For example, dual SIM device 200 may measure real-time QoS using the connected SIM 221 and radio 211. If primary SIM 221 is able to produce data with sufficient quantity and quality to satisfy the needs of application layer 240 in step 315 and/or the quality of service for the network connection to the first access point 315 satisfies a condition (e.g., an absolute or relative threshold), then as shown by step 320 the application layer 220 will use real-time data from primary SIM 221, while also activating (e.g., waking up) the second radio 212. In some embodiments, step 320 may include the second radio 212 not only waking up, but also connecting to the first access point 251. Primary SIM 221 will often provide real-time time to application layer 240 as long as it is able to: hence, step 320 may continue throughout steps 325-360 discussed below.

Signal strength measurements may be performed by the SIM 222 that is not being used. The signal strengths may be Reference Signal Received Power (RSRP), Reference Signal Received Quality (RSRQ), or other power measurement metrics. If a network connection to the second access point 252 is stronger than a current network connection to the first access point 251 (optionally, plus a defined delta or offset) in step 325, then the second radio 212 will connect to the second access point 252 in step 332. Otherwise, the second radio 212 will be connected to the first access point 251 in step 331.

Once the second radio 212 is connected to an access point in either step 331 or step 332, a determination is made as to the quality of the data in cache 230. This may involve a determination that the data in cache 230 is of insufficient quality, e.g., corrupt or unreliable, with an unacceptably high bit error rate. Additionally or alternatively, this may involve a determination that data in cache 230 is stale: e.g., the data in cache 230 was not consumed before a specified time threshold. Staleness may occur with cached data which is expected to change frequently, such as social media updates or other interpersonal communications, such as emails or text messages.

If step 345 determines that the data in the cache is good, then process 300 advances to step 350, where the second SIM 222 stores additional data in cache 230, such as data which is likely to be used by application layer 240 in the future, as discussed above. If step 345 determines that the data in the cache is bad (e.g., corrupt and/or stale), then the process 300 advances to step 360, where the second SIM 222 replaces and/or refreshes the bad data stored in the cache with data which is valid and/or updated. As discussed above, if there is sufficient storage capacity available in cache 230, the bad data may be retained along with the replacing/refreshing data, rather than replaced with the new data.

After step 350 or step 360, process 300 returns to step 315, to determine again whether the primary SIM 221 is keeping up with the data demands of the application layer 340 and/or whether the QoS of the network connection had degraded. In an implementation, if the measured QoS is less than a previous measurement but still above the required (minimum threshold) QoS, then more frequent measurements may be made. If the performance of the primary SIM 221 and the network connection of first radio 211 meets the requisite standards, then the process repeats steps 320-360 as discussed above. If the performance of the primary SIM 221 and the network connection of first radio 211 has fallen below minimum standards, the application layer 240 fetches the data stored in the cache 230 in lieu of or in addition to the real-time data from primary SIM 221. In some implementation, the application layer 240 may begin to fetch stored data from cache 230 in step 370 if the performance has gone down for a defined number of measurements but has not yet fallen below the specified minimum threshold(s).

Figure 4:
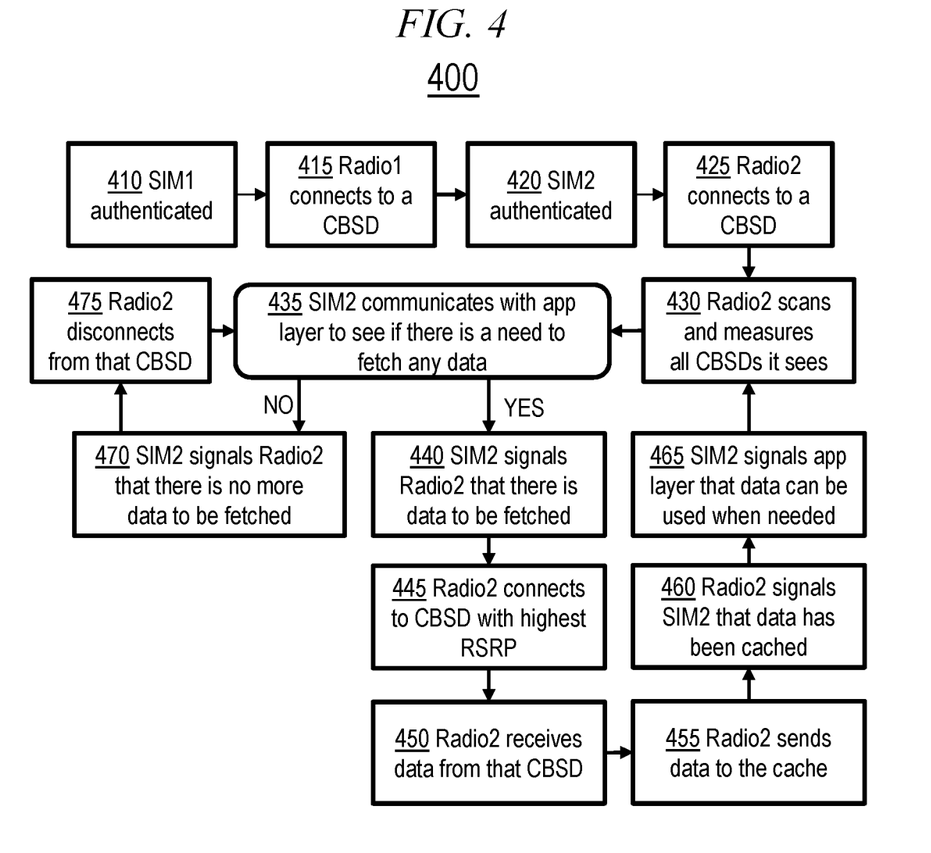
FIG. 4 is a flowchart showing another network communication process in accordance with one or more aspects of the invention.

FIG. 4 is a flowchart showing another network communication process in accordance with one or more aspects of the invention. Process 400 begins with steps 410-425, in which the first SIM 221 and second SIM 222 are authenticated, and the first radio 211 and second radio 212 connect to a CBSD. As discussed above with reference to FIG. 2, the first radio 211 and second radios 212 may both connect to the same CBSD 251, or the first radio 211 and second radio 212 may connect to different CBSDs 251, 252 respectively. In an illustrative embodiment, SIMs 221 and 222 both connect to the same network (e.g., CBRS 1300 in FIG. 1), and therefore it does not matter which is designated as the first SIM and second SIM.

In step 430, the second radio 212 scans and measures the signal strengths for all CBSDs that it detects. In an implementation, the signal strength measurements may be performed by the SIM 222 that is not being used. The signal strengths may be Reference Signal Received Power (RSRP), Reference Signal Received Quality (RSRQ), or other power measurement metrics.

In step 435, the second SIM 222 communicates with the application layer 240 to see if there is a need to fetch any data from the network for storage in cache 230. If so, the process continues to step 440, where the second SIM 222 signals the second radio 212 that there is data to be fetched from the network and stored in cache 230. In step 445, the second radio 212 connects to the CBSD with the best signal strength (e.g., highest RSRP) as measured in step 430. This may or may not be a different CBSD than that to which the first radio 211 is connected; however, it will be within the same network.

In step 450, the second radio 212 receives data from the CBSD to which it has connected. As discussed above with reference to FIG. 2, the data received by the second radio 212 may include one or more of: duplicates of data which is also received by the first radio 211, other portions of a file or stream which is received by the first radio 211, data which is expected to be used by an application and/or user in the future, and data with a lower priority than the data received by the first radio 211. In step 455, the data received by the second radio 212 is stored in the cache 230. In step 460, the second radio 212 signals the second SIM 222 that the requested data has been fetched from the network and stored in cache 230. In step 465, the second SIM 222 signals the application layer 240 that the requested data is in the cache 230 and can be used when needed.

After step 465, the process 400 returns to step 430, where the second radio scans and measures the signal strengths of all of the CBSDs, followed by step 435, where the second SIM 222 communicates with the application layer 240 to see if there is a need to fetch any data from the network and store it in the cache 230. If there is a need in step 435 to fetch data from the network and store it in the cache 230, the process repeats steps 440-465 as discussed above. If not, the process proceeds to step 470, in which the second SIM 222 signals the second radio 212 that there is no more data to be fetched. In step 475, the second radio 212 disconnects from the CBSD, and then the process returns to step 435, in which there the second SIM 222 periodically and/or continuously polls the application layer 240 to see if there is a need to fetch data and store it in the cache 230.

Recapitulation

Given the discussion thus far, it will be appreciated that, in general terms, an aspect of the invention includes a method for use with a mobile device comprising a plurality of subscriber identification modules sharing a cache. The method includes a first subscriber identification module authenticating with and connecting to the network, followed by a second subscriber identification module authenticating with and connecting to the network. The method also includes, while the first subscriber identification module is requesting and receiving first data from the network and storing the first data in the cache, the second identification module requesting and receiving second data from the network and storing the second data in the cache. The method further includes an application executing on the device retrieving and processing at least a portion of the first and second data stored in the cache, while at least one of the first and second subscriber identification modules is storing additional data received from the network in the cache.

Another aspect of the invention includes a computer program product usable within a mobile communications device, wherein the device comprises a plurality of subscriber identification modules sharing a hardware cache. The computer program comprises a non-transitory machine-readable storage medium having machine-readable program code embodied therewith. The machine-readable program code is operative to cause the device to perform a method comprising: a first subscriber identification module authenticating with and connecting to a network, followed by a second subscriber identification module authenticating with and connecting to the network; while the first subscriber identification module is requesting and receiving first data from the network and storing the first data in the cache, the second identification module requesting and receiving second data from the network and storing the second data in the cache; and an application executing on the device retrieving and processing at least a portion of the first and second data stored in the cache, while at least one of the first and second subscriber identification modules is storing additional data received from the network in the cache.

A further aspect includes a mobile communications device comprising a memory comprising a hardware cache, and a plurality of subscriber identification modules sharing the cache. The device further comprises a processor operative to cause the device to perform a method comprising: the first subscriber identification module authenticating with and connecting to the network, followed by a second subscriber identification module authenticating with and connecting to the network; while the first subscriber identification module is requesting and receiving first data from the network and storing the first data in the cache, the second identification module requesting and receiving second data from the network and storing the second data in the cache; and an application executing on the device retrieving and processing at least a portion of the first and second data stored in the cache, while at least one of the first and second subscriber identification modules is storing additional data received from the network in the cache.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 5:
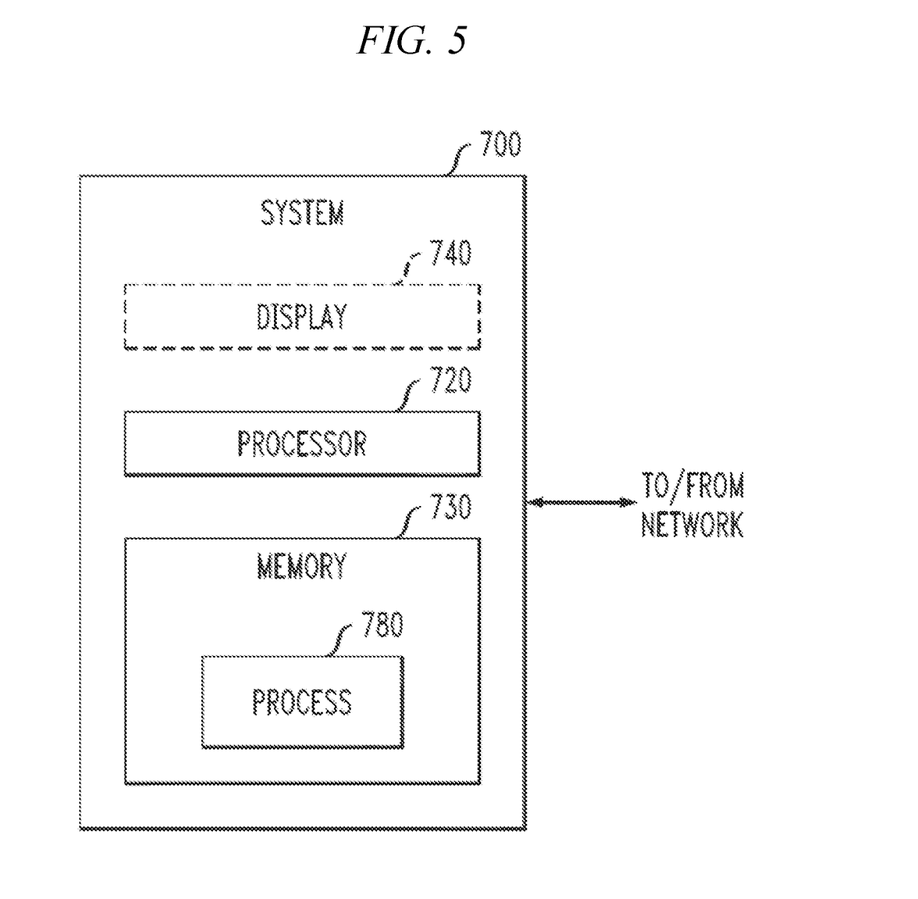
FIG. 5 is a block diagram of a computer system useful in connection with one or more aspects of the invention.

FIG. 5 is a block diagram of a system 700 that can implement at least some aspects of the invention, and is representative, for example, of one or more of the servers shown in the figures. As shown in FIG. 5, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use with a mobile communications device comprising a plurality of subscriber identification modules sharing a hardware cache, the method comprising:
    a first subscriber identification module authenticating with and connecting to a network, and a second subscriber identification module authenticating with and connecting to the network, wherein the network comprises a citizens broadband radio service, wherein the first subscriber identification module connects to the network through a first one of a plurality of Citizens Broadband Radio Service devices (CBSDs) within the network, and wherein the second subscriber identification module connects to the network through a second one of the plurality of Citizens Broadband Radio Service devices (CBSDs) within the network;
    the first subscriber identification module requesting and receiving first data from the network and storing the first data in the cache, the second subscriber identification module requesting and receiving second data from the network and storing the second data in the cache, wherein the first subscriber identification module and the second subscriber identification module simultaneously exchange data with the network for at least a point in time; and
    an application executing on the device retrieving and processing at least a portion of the first and second data stored in the cache, while at least one of the first and second subscriber identification modules is storing additional data received from the network in the cache.

2. The method of claim 1, wherein the first data is requested from the network and stored in the cache by the first subscriber identification module for processing by the application substantially in real time, and wherein the second data is requested from the network and stored in the cache by the second subscriber module for processing at a time after the first data has been processed.

3. A method for use with a mobile communications device comprising a plurality of subscriber identification modules sharing a hardware cache, the method comprising:
    a first subscriber identification module authenticating with and connecting to a network, and a second subscriber identification module authenticating with and connecting to the network;
    the first subscriber identification module requesting and receiving first data from the network and storing the first data in the cache, the second subscriber identification module requesting and receiving second data from the network and storing the second data in the cache, wherein the first subscriber identification module and the second subscriber identification module simultaneously exchange data with the network for at least a point in time; and
    an application executing on the device retrieving and processing at least a portion of the first and second data stored in the cache, while at least one of the first and second subscriber identification modules is storing additional data received from the network in the cache, wherein at least a portion of the second data is a duplicate of at least a portion of the first data, such that the portion of the second data is processed by the application instead of the portion of the first data.

4. A method for use with a mobile communications device comprising a plurality of subscriber identification modules sharing a hardware cache, the method comprising:
    a first subscriber identification module authenticating with and connecting to a network, and a second subscriber identification module authenticating with and connecting to the network;
    the first subscriber identification module requesting and receiving first data from the network and storing the first data in the cache, the second subscriber identification module requesting and receiving second data from the network and storing the second data in the cache; and
    an application executing on the device retrieving and processing at least a portion of the first and second data stored in the cache, while at least one of the first and second subscriber identification modules is storing additional data received from the network in the cache, wherein the first subscriber identification module connects to the network through a first sector of a given Citizens Broadband Radio Service device (CBSD) within the network, and wherein the second subscriber identification module connects to the network through a second sector of the given Citizens Broadband Radio Service device (CBSD) within the network.

5. A method for use with a mobile communications device comprising a plurality of subscriber identification modules sharing a hardware cache, the method comprising:
    a first subscriber identification module authenticating with and connecting to a network, followed by a second subscriber identification module authenticating with and connecting to the network;

while the first subscriber identification module is requesting and receiving first data from the network and storing the first data in the cache, the second identification module requesting and receiving second data from the network and storing the second data in the cache; and an application executing on the device retrieving and processing at least a portion of the first and second data stored in the cache, while at least one of the first and second subscriber identification modules is storing additional data received from the network in the cache, wherein the first subscriber identification module authenticating with and connecting to the network, followed by the second subscriber identification module authenticating with and connecting to the network, further comprises:

the first subscriber identification module authenticating with and connecting to a first one of a plurality of Citizens Broadband Radio Service devices (CBSDs) within the network; and responsive to detection of a trigger, the second subscriber identification module:
  selecting either the first one or a second one of the plurality of Citizens Broadband Radio Service devices (CBSDs); and
  authenticating with and connecting to the selected one of the plurality of Citizens Broadband Radio Service devices (CBSDs).

6. The method of claim 5, further comprising measuring signal metrics for respective ones of the plurality of Citizens Broadband Radio Service devices (CBSDs) within the network, wherein the first or second one of the plurality of Citizens Broadband Radio Service devices (CBSDs) is selected based at least in part on the measured signal metrics.

7. The method of claim 6, wherein the second subscriber identification module measures the signal metrics responsive to detection of the trigger.

8. The method of claim 6, wherein the signal metrics comprise at least one of Reference Signal Received Power (RSRP) and Reference Signal Received Quality (RSRQ).

9. The method of claim 5, wherein the trigger is based at least in part on the connection between the first subscriber identification module and the first one of the plurality of Citizens Broadband Radio Service devices (CBSDs) within the network.

10. The method of claim 9, wherein the trigger indicates that the connection of the first subscriber identification module to the network is sufficiently strong that the second subscriber identification module should connect to the network and receive the second data.

11. The method of claim 9, wherein the trigger indicates that the connection of the first subscriber identification module to the network is sufficiently weak that second subscriber identification module should connect to the network and receive the second data.

12. The method of claim 5, wherein the trigger indicates that the application requires the second data to be received from the network and stored in the cache.

13. The method of claim 12, wherein the trigger indicates that the application is consuming the first data from the cache faster than the first subscriber identification module is storing the first data in the cache after receiving the first data from the network.

14. The method of claim 12, further comprising the steps of:
  after the second subscriber identification module connects to the network, the second subscriber identification module requesting and receiving the second data from the network and storing the second data in the cache; and
  after the second subscriber identification module stores the second data in the cache, determining whether the application requires additional data to be received from the network and stored in the cache; and
  if the application does require the additional data to be received from the network and stored in the cache, the second subscriber identification module requesting and receiving the second data from the network and storing the second data in the cache;
  if the application does not require the additional data to be received from the network and stored in the cache, the second subscriber identification module disconnecting from the network.

15. The method of claim 14, wherein the second subscriber module is powered on responsive to detection of the trigger, and wherein the second subscriber identification module is powered off upon disconnecting from the network.

16. A computer program product usable within a mobile communications device, the device comprising a plurality of subscriber identification modules sharing a hardware cache, the computer program comprising a non-transitory machine-readable storage medium having machine-readable program code embodied therewith, said machine-readable program code being operative to cause the device to perform a method comprising:
  a first subscriber identification module authenticating with and connecting to a network, and a second subscriber identification module authenticating with and connecting to the network;
  the first subscriber identification module requesting and receiving first data from the network and storing the first data in the cache, the second subscriber identification module requesting and receiving second data from the network and storing the second data in the cache, wherein the first subscriber identification module and the second subscriber identification module simultaneously exchange data with the network for at least a point in time; and
  an application executing on the device retrieving and processing at least a portion of the first and second data stored in the cache, while at least one of the first and second subscriber identification modules is storing additional data received from the network in the cache, wherein the network comprises a citizens broadband radio service, wherein the first subscriber identification module connects to the network through a first one of a plurality of Citizens Broadband Radio Service devices (CBSDs) within the network, and wherein the second subscriber identification module connects to the network through a second one of the plurality of Citizens Broadband Radio Service devices (CB SDs) within the network.

17. A mobile communications device, comprising:
a memory comprising a hardware cache;
a plurality of subscriber identification modules sharing the cache; and
a processor operative to cause the device to perform a method comprising:
  the first subscriber identification module authenticating with and connecting to the network, and a second subscriber identification module authenticating with and connecting to the network;

the first subscriber identification module requesting and receiving first data from the network and storing the first data in the cache, the second identification module requesting and receiving second data from the network and storing the second data in the cache, wherein the first subscriber identification module and the second subscriber identification module simultaneously exchange data with the network for at least a point in time; and an application executing on the device retrieving and processing at least a portion of the first and second data stored in the cache, while at least one of the first and second subscriber identification modules is storing additional data received from the network in the cache, wherein the network comprises a citizens broadband radio service, wherein the first subscriber identification module connects to the network through a first one of a plurality of Citizens Broadband Radio Service devices (CBSDs) within the network, and wherein the second subscriber identification module connects to the network through a second one of the plurality of Citizens Broadband Radio Service devices (CBSDs) within the network.

18. The device of claim 17, further comprising a plurality of radio frequency transceivers corresponding to respective ones of the plurality of subscriber identification modules, wherein the first and second subscriber identification modules connect to and receive data from the network through respective first and second radio frequency transceivers.

\* \* \* \* \*